United States Patent Office 3,173,807
Patented Mar. 16, 1965

3,173,807
METHOD FOR THE PREPARATION OF DUSTLESS STARCHES
Nicholas G. Marotta, Milltown, and John J. Ryan, Westfield, N.J., assignors to National Starch and Chemical Corporation, New York, N.Y., a corporation of Delaware
No Drawing. Filed Nov. 9, 1962, Ser. No. 236,689
4 Claims. (Cl. 127—32)

This invention relates to a method for preparing starches which exhibit a minimum degree of dusting. More particularly, it releates to the preparation of dustless starches by the admixture of starch with certain dust reducing additives.

Mineral oil has heretofore been added to powdered starches and starch products in order to reduce the amount of starch dust that is usually generated by these finely ground materials. It is particularly desirable to reduce the quantity of starch dust because of the explosion hazard which such dust presents. Although the utilization of mineral oil effectively reduces the amount of starch dust, several disadvantages accompany its use. Thus, mineral oil is not digested by the body and therefore does not find acceptance in food products. In addition, the use of mineral oil has been found to have deleterious effects on the film forming and adhesive qualities of most starches and starch products.

It is an object of this invention to provide powdered starches which exhibit a minimum degree of dusting. Another object of the invention is to minimize the dust formation of powdered starches without detrimentally affecting their film forming and adhesive properties. Other objects and the advantages of this invention will be apparent from the description that appears hereinafter.

In accordance with the invention, starch which has been powdered, or otherwise subjected to an attrition grinding process, is admixed with a small amount of an ester of a polyhydric alcohol and an aliphatic monobasic acid. For the purposes of this invention, the term "starch" comprehends all types of raw starches as well as derivatives thereof, including raw starches derived from such sources as corn, high amylose corn, wheat, potato, waxy maize, tapioca, sorghum, sago, or rice, and derivatives of the foregoing starches, including esterified, etherified, converted, and thin boiling starches still retaining amylaceous material.

The dust reducing additives employed in the process of our invention comprise esters derived from the reaction of a polyhydric alcohol having less than four carbon atoms with at least one acid selected from the group consisting of aliphatic monobasic acids having no more than three carbon atoms. Exemplary of the esters suitable for use in our invention are triethyl citrate, tributyl citrate, ethyl acetoacetate, glyceryl monoacetate, glyceryl diacetate, glyceryl triacetate, glyceryl monopropionate, glyceryl tripropionate, ethylene glycol diacetate, trimethylene glycol diacetate, ethylene glycol dipropionate, propylene glycol diacetate, and the like. In addition, combinations of two or more of these dust reducing esters may also be used. It may be noted that optimum results are obtained by the use of glyceryl triacetate, which is commonly referred to as triacetin.

The esters which are applicable to our invention may be used in a wide range of concentrations. It is preferred, however, that they be utilized in amounts varying from about .005% to about 5.0%, by weight of the dry starch with which they are to be blended. Amounts of ester greater than 5.0% can be used but the improvement in dusting properties attained by the increased concentration is negligible.

In preparing our mixtures of starch and ester, any of the conventional blending techniques known to the practitioner may be utilized. Thus, for example, the ester may be dissolved or dispersed in water or an organic solvent and thereafter sprayed onto the dry starch. Alternatively, the ester may be admixed directly with the dry starch, without using any solvent medium. The means employed to blend the starch and ester is not critical to our invention. It is only necessary that the ester be brought into intimate contact with the dry starch.

The process of our invention therefore enables the practitioner to prepare substantially dustless starches. The advantages of such dustless products with respect to their handling, transporting, and packaging are obvious. Moreover, we have obtained essentially dustless starches without sacrificing the film forming and adhesive properties thereof.

In the following examples, which further illustrate the embodiment of this invention, all parts given are by weight unless otherwise indicated.

Examples

These examples illustrate the preparation of essentially dustless starches by the admixture of starches with various dust reducing esters, as taught by the process of our invention.

In preparing the dustless starches of these examples, the ester utilized was simply blended with the starch so as to obtain an intimate mixture of ester and starch.

In determining the amount of dust generated by a particular starch, we employed a comparative quantitative test procedure based on the collection of fine dust particles which are extremely lighter than larger starch particles. In conducting this test, we permitted a weighed sample of the starch being tested to fall freely through a glass column open at both ends. After a definite period of time, viz., 4 seconds, the column was closed by inserting a paper square at the lower end of the column. In this column the heavy starch particles descended more rapidly than the fine dust particles, and we were thus able to effect an efficient separation of the dust from the larger particles. The dust that had collected on the paper squares was then weighed, and the percent dust produced was calculated on the basis of the weight of the starch sample used, which, in the examples that follow, was 10 grams.

The test procedure heretofore described was utilized to compare the amount of dust produced by starches treated with the esters used in our invention with the amount of dust produced by starches not so treated. The results of this comparison are set forth in the following table:

| Starch Tested | Sample No. | Anti-dusting Ester | | Percent Dust (based on dry weight of starch) |
|---|---|---|---|---|
| | | Type | Amount (percent by weight based on dry weight of starch) | |
| Corn Starch | 1 | | | 0.499 |
| | 2 | Triacetin | 0.01 | 0.402 |
| | 3 | do | 0.02 | 0.203 |
| | 4 | do | 0.08 | 0.089 |
| | 5 | do | 0.10 | 0.078 |
| Thin boiling waxy maize starch [a] | 1 | | | 0.181 |
| | 2 | Triacetin | 0.02 | 0.069 |
| Starch acid-ester product [b] | 1 | | | 0.675 |
| | 2 | Triacetin | 0.02 | 0.052 |
| High amylose corn starch (57% amylose). | 1 | | | 0.161 |
| | 2 | Tributyl citrate | 3.0000 | 0.023 |
| | 3 | Triacetin | 0.0005 | 0.172 |
| | 4 | do | 0.0050 | 0.036 |
| | 5 | do | 0.0500 | 0.033 |
| | 6 | do | 0.5000 | 0.015 |
| | 7 | do | 5.0000 | 0.000 |
| Waxy maize starch | 1 | | | 0.131 |
| | 2 | Triethyl citrate | 0.5000 | 0.043 |
| | 3 | Triacetin | 0.0005 | 0.081 |
| | 4 | do | 0.0050 | 0.097 |
| | 5 | do | 0.0500 | 0.062 |
| | 6 | do | 0.5000 | 0.039 |
| | 7 | do | 5.0000 | 0.013 |

[a] Prepared by the acid conversion of waxy maize starch to a degree known in the trade as 85 fluidity.
[b] Reaction product of aluminum sulfate and starch acid-ester as per Example I of U.S. patent 2,613,206.

It can be seen, therefore, that the use of the esters employed in our procedure effects a substantial improvement in decreasing the amount of starch dust produced by a variety of starches.

Any departure from the above description which conforms to the present invention is intended to be included within the scope of the invention as defined by the following claims.

We claim:
1. A method for the preparation of dustless essentially dry, powdered starches comprising admixing an essentially dry, powdered starch with an ester derived from the reaction of a polyhydric alcohol having less than four carbon atoms with at least one acid selected from the group consisting of aliphatic monobasic acids having from two to three carbon atoms, wherein said ester is present in amounts varying from 0.005% to 0.08%, by weight, as based on the dry weight of the starch.

2. The method of claim 1 wherein said ester is glyceryl triacetate.

3. A dustless essentially dry, powdered starch which contains an ester derived from the reaction of a polyhydric alcohol having less than four carbon atoms with at least one acid selected from the group consisting of aliphatic monobasic acids having from two to three carbon atoms, wherein said ester is present in amounts varying from 0.005% to 0.08%, by weight, as based on the dry weight of the starch.

4. The dustless essentially dry, powdered starch of claim 3 wherein said ester is glyceryl triacetate.

References Cited by the Examiner
UNITED STATES PATENTS

| 2,779,694 | 1/57 | Pacsu et al. | 127—71 |
| 2,935,510 | 3/60 | Wursburg | 99—139 |
| 3,074,803 | 1/63 | McGowan et al. | 99—134 |

MORRIS O. WOLK, *Primary Examiner.*